United States Patent
Dees et al.

(10) Patent No.: US 11,856,406 B2
(45) Date of Patent: Dec. 26, 2023

(54) SECURING HEADLESS DEVICES FROM MALICIOUS (RE-)CONFIGURATION

(71) Applicant: KONINKLIJKE PHILIPS N.V., Eindhoven (NL)

(72) Inventors: Walter Dees, Eindhoven (NL); Ton Brouwer, Best (NL); Franciscus Antonius Maria Van De Laar, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 326 days.

(21) Appl. No.: 16/963,853

(22) PCT Filed: Jan. 25, 2019

(86) PCT No.: PCT/EP2019/051812
§ 371 (c)(1),
(2) Date: Jul. 22, 2020

(87) PCT Pub. No.: WO2019/145456
PCT Pub. Date: Aug. 1, 2019

(65) Prior Publication Data
US 2020/0359205 A1    Nov. 12, 2020

Related U.S. Application Data

(60) Provisional application No. 62/622,984, filed on Jan. 29, 2018.

(51) Int. Cl.
*H04W 12/50* (2021.01)
*G06F 21/43* (2013.01)
*H04W 4/80* (2018.01)
*G06F 21/62* (2013.01)
*H04L 9/40* (2022.01)

(52) U.S. Cl.
CPC ............ *H04W 12/50* (2021.01); *G06F 21/43* (2013.01); *G06F 21/6245* (2013.01); *H04L 63/18* (2013.01); *H04W 4/80* (2018.02)

(58) Field of Classification Search
CPC ......... H04W 12/50; H04W 4/80; G06F 21/43; G06F 21/6245; H04L 63/18
See application file for complete search history.

(56) References Cited

U.S. PATENT DOCUMENTS 9,059,984 B2 *  6/2015  Brown ................... H04L 63/20
9,574,671 B1 *  2/2017  Amberg ................. H04W 4/02
(Continued)

FOREIGN PATENT DOCUMENTS

EP    2717632 A2    4/2014

OTHER PUBLICATIONS

International Search Report and Written Opinion of PCT/EP2019/05812, dated Apr. 18, 2019.
(Continued)

*Primary Examiner* — Gary S Gracia (57) ABSTRACT

Systems, apparatuses, and methods include technology including a headless medical device for performing implementing a medical resource or function in context with a configuration device and an optional host device for locking or unlocking a lock status of the headless medical device respective to action requests relating to the medical resource or function.

20 Claims, 11 Drawing Sheets

(56) References Cited

U.S. PATENT DOCUMENTS

| | | | | |
|---|---|---|---|---|
| 9,801,770 | B2* | 10/2017 | Edavana | A61G 11/008 |
| 10,313,506 | B2* | 6/2019 | Soli | H04W 4/14 |
| 10,366,220 | B2* | 7/2019 | Shapiro | H04W 12/33 |
| 10,987,468 | B2* | 4/2021 | Mazlish | A61M 5/14244 |
| 11,126,909 | B2* | 9/2021 | Bryant | H04B 5/0062 |
| 2009/0099866 | A1* | 4/2009 | Newman | G16H 40/20 705/2 |
| 2011/0009724 | A1* | 1/2011 | Hill | G01C 21/20 705/26.81 |
| 2014/0304773 | A1* | 10/2014 | Woods | H04L 63/08 726/3 |
| 2015/0011970 | A1* | 1/2015 | Kamen | G16H 10/65 604/151 |
| 2015/0231012 | A1* | 8/2015 | Rapoport | A61G 11/006 29/428 |
| 2015/0310452 | A1* | 10/2015 | Baitch | G06F 21/35 726/20 |
| 2015/0350861 | A1* | 12/2015 | Soli | H04M 1/72421 455/26.1 |
| 2015/0371467 | A1* | 12/2015 | Wang | G07C 9/00309 340/5.6 |
| 2016/0275275 | A1* | 9/2016 | Wang | H04M 1/67 |
| 2016/0337863 | A1* | 11/2016 | Robinson | H04W 4/021 |
| 2017/0289800 | A1 | 10/2017 | Frusina | |
| 2017/0312530 | A1* | 11/2017 | Schilling | H04W 80/10 |
| 2017/0037260 | A1 | 12/2017 | Palin | |
| 2017/0367049 | A1 | 12/2017 | Hanchett | |
| 2018/0011988 | A1* | 1/2018 | Ziegler | G06F 21/305 |
| 2018/0068105 | A1* | 3/2018 | Shapiro | G06F 21/602 |
| 2018/0099643 | A1* | 4/2018 | Golsch | G01S 13/765 |
| 2018/0103414 | A1* | 4/2018 | Golsch | G07C 9/00309 |
| 2018/0161058 | A1* | 6/2018 | Lesko | A61B 90/03 |
| 2018/0161059 | A1* | 6/2018 | Lesko | A61B 90/03 |
| 2018/0161060 | A1* | 6/2018 | Roberson | A61B 1/00042 |
| 2018/0310806 | A1* | 11/2018 | Gavalis | A61B 1/00133 |
| 2019/0035184 | A1* | 1/2019 | Okada | G07C 9/28 |
| 2019/0087775 | A1* | 3/2019 | Buehre | G06Q 10/0833 |
| 2019/0182649 | A1* | 6/2019 | Best | H04W 4/70 |
| 2022/0287119 | A1* | 9/2022 | Daniels | H04W 12/50 |

OTHER PUBLICATIONS

Toutain, Laurent et al. Static Context Header Compression(SCHC), LPWAN 1997.

* cited by examiner

SECURING HEADLESS DEVICES FROM MALICIOUS (RE-)CONFIGURATION

This application is the U.S. National Phase application under 35 U.S.C. § 371 of International Application No. PCT/EP2019/051812, filed on Jan. 25, 2019, which claims the benefit of U.S. Provisional Application Ser. No. 62/622,984, filed Jan. 29, 2018. These applications are hereby incorporated by reference herein.

FIELD

The following relates generally to wireless medical sensors, low power wireless sensors, mobile sensors, and to other similar applications.

BACKGROUND

In healthcare, the Internet of Things (IoT) is expected to bring a lot of benefits, such as removing the clutter of wires and providing personal freedom of movement by applying wireless sensor and actuator devices. For example, a wireless vital sign sensor can connect to the hospital network to allow constant upload of vital sensor information or warn the nursing staff with an alarm in case of an adverse event. Actuator devices, such as drug delivery devices may be wirelessly connected to the hospital network to receive events to administer drugs and/or to get configured (e.g. for changing the automatic dosage) for treatment.

An issue with wireless medical devices is ensuring security of the wireless communications. Malicious attacks on medical devices can be very harmful or even deadly for the patients for whom these wireless sensors or actuators are being applied. For example, if a wireless drug-delivery actuator device (e.g., a wireless infusion pump) may receive too many events to administer drugs, or be maliciously (re-)configured with the wrong dosage for a patient, this can have fatal consequences. This is sometimes addressed by using short-range or proximity-based wireless protocols. However, a short range communication protocol such as Bluetooth has a range of up to 20 meters or so, providing substantial space for a malicious attack. A proximity-based wireless protocol such as Near-Field Communication (NFC) has a much shorter range, e.g. requiring proximity of a few centimeters, which may be considered to be safer. However, a concern remains in that after the medical device has been configured it is still possible that someone with access to the patient (e.g. a non-staff visitor entering while the patient is asleep) may use the same proximity based wireless protocol (e.g. NFC) to re-configure the device.

Another example of a malicious attack is a Bluetooth sensor that could be subject to a man-in-the-middle attack. Here the medical device is requested to connect to a hacker's cellphone or other Bluetooth-equipped mobile device, instead of connecting to the hospital network. In a man-in-the-middle attack, hospital staff may not be able to track the vital signs of that patient anymore (denial of service).

In order to prevent such a man-in-the-middle attack, proximity-based out-of-band pairing methods (such as NFC) can be used to configure the sensors with passkey/pairing information. If this operation is performed by hospital staff, e.g. by using an authorized portable device in close vicinity of the sensor to perform this NFC operation, before applying it to the patient, this may be considered safe. However, a problem remains in that after the sensor has been applied it is still possible that someone with access to the patient (e.g. a non-staff visitor) to use the same proximity based pairing method to set up different passkeys into the sensor and take over the connection to the sensor with a rogue device (e.g. Bluetooth-equipped cellphone).

Similarly, if the proximity-based wireless protocol (e.g. NFC) is used to configure a sensor device (e.g. frequency of sending measurements, destination IP address to send sensor data, wireless operating frequency), a malicious device may configure the sensor to a undesired state of operation.

The following discloses certain improvements.

SUMMARY

In some illustrative embodiments disclosed herein, a device comprises a first communication interface for communicating with the device, a second communication interface for communicating with the device, a programmable electronic chip, and a non-transitory storage medium storing instructions readable and executable by the programmable electronic chip to operate a sensor or actuator or other medical function and to perform a communication method. The communication method includes: controlling, via the second communication interface, a lock status of the device; receiving, via the first communication interface, an action request relating to the second communication interface or to the medical function; and executing the action request conditional upon the lock status being in an unlocked state. In some embodiments, the first communication interface comprises a first radio (R1) operating in accord with a first wireless protocol, and the second communication interface comprises a second radio (R2) operating in accord with a second wireless protocol; e.g., the first radio may operate in accord with a Near-Field Communication (NFC) protocol and the second radio may operate with a Bluetooth protocol; or, in other such embodiments, the first radio and the second radio may be two different virtual radios sharing the same physical radio transceiver hardware. In some alternative embodiments, one of the first and second communication interfaces comprises a radio and the other of the first and second communication interfaces comprises a wired communication interface. In some embodiments of the disclosed device, the communication method further includes, upon changing the lock status of the device to locked, one of the following actions: (a) deactivating the first communication interface; (b) activating a firewall blocking incoming messages on first communication interface; or (c) ignoring any incoming action request messages on first communication interface.

In some illustrative embodiments disclosed herein, a system comprises a device as set forth in the immediately preceding paragraph, and a configuration device configured to transmit a security credential relating to the second communication interface over the first communication interface when the lock status of the device is unlocked. The device uses this credential to set up a secure communication channel over the second communication interface, and the device switches the lock status to locked. In some illustrative embodiments disclosed herein, a system comprises a device as set forth in the immediately preceding paragraph, and a configuration device configured to transmit via the first communication interface the action request and to control, via the second communication interface, the lock status of the device. Either of the foregoing system embodiments may optionally further comprise a host device cooperating with the configuration device to control, via the second communication interface, the lock status of the device.

Some illustrative embodiments disclosed herein include a headless medical device for implementing a medical resource or function in context with a configuration device and an optional host device for locking or unlocking a lock status of the headless medical device respective to action requests relating to the medical resource or function.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

Many wireless protocols are susceptible to compromise by a malicious person who has physical access or can get in close proximity to a wireless medical device. Proximity based authentication methods such as NFC are usually considered sufficiently secure for use in payment transactions. However, these proximity-based authentication methods cannot prevent an unauthorized person from misusing a wireless medical device. Authentication operates to verify the identity of a person or a device that tries to access a certain resource. However, authentication is not the same as authorization, which is the function of enforcing access rights to a certain resource, which may be different for each person or device that tries to access the resource. For the example of payment systems, there are known identity verification and authorization protocols in place to avoid abuse. On many payment devices the authorization problem is solved by administering several users on the device's operating system, each having their own access rights to certain privileged resources.

However, it is quite cumbersome and complex to enforce rules for many different users on a simple device such as a low-cost, low-power wireless sensor or actuator device, due to limited resources, storage space, lack of I/O modalities for easy configuration or for providing login procedures and feedback to the user. For example, in the medical context numerous types of medical sensors or actuators are constructed as headless devices, in which the device does not have a graphical user interface but rather communicates with the outside world by way of an electronic data network link (e.g. Bluetooth, NFC, or so forth). In some cases, a headless device may include no integral input or output capability, and all communication is via one or more electronic data network links. In other embodiments, a headless device may include one or more simple input and/or output controls or devices, such as a reset button, a seven-bar LED display, or so forth, which however is not sufficient to easily configure the headless device (rather, communication is via one or more electronic data network links is required for full functionality).

For a headless medical device, employing a security paradigm in which the device has multiple defined users each having certain privileged resources is difficult and cumbersome to implement. Indeed, such headless medical devices are usually intended for rapid and simple deployment to monitor a patient or actuate certain therapy (e.g. intravenous drug delivery or so forth), and requiring a complex user-specific authorization process is antithetical to this goal. (For example, authentication might require entry of a username and password via some user interface that would first need to be connected with the headless device via a Bluetooth or other wireless connection). Thus, with headless medical devices, typically only generic rules are applied. For example, anyone within close vicinity, and/or anyone with a (single) password or passcode may be allowed access to use or (re-)configure the resources of such device.

As mentioned, close vicinity is not always sufficient protection, in particular case of healthcare devices. This could be mitigated by building in a shared secret (e.g. password or passcode), typically at factory time. However, this adds complexity to the manufacturing process since each device would have to be equipped with a different shared secret, and makes the device less flexible to operate in different environments, and additionally it is difficult to ensure confidentiality of a single password or passcode that must be shared amongst all authorized users of the medical device. To mitigate unauthorized access to a built-in shared secret, it may be necessary to create tamper resistant hardware to prevent access to built-in storage or to prevent a chipset of the device from being used to do things out of the ordinary by influencing physical parameters. However, tamper-resistant hardware adds a lot of extra complexity is not effective for preventing wireless attacks on headless medical devices. In case of headless devices, the wireless radio is the easiest and primary "channel" to gain access to the device or to configure the device perform unauthorized actions.

Another factor that can influence the design of headless device security measures is that there should be a balance between the complexity of these sensors/actuator devices and their power consumption, as some of these may even be implanted in a person's body in future.

Figure 1:
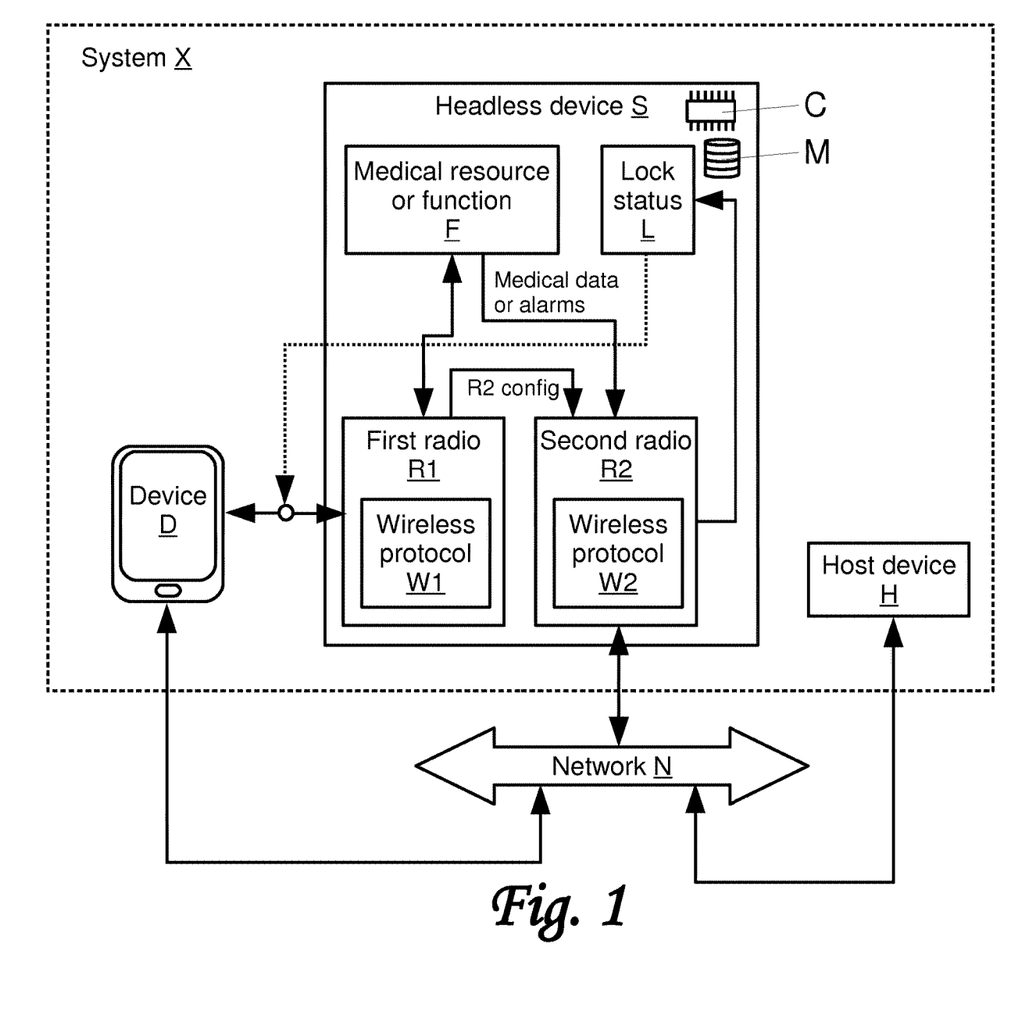
FIG. 1 diagrammatically illustrates a headless medical device for performing implementing a medical resource or function in context with a configuration device and an optional host device for authorizing the configuration device to lock or unlock the lock status of the headless medical device respective to action requests relating to the medical resource or function.
Figure 2:
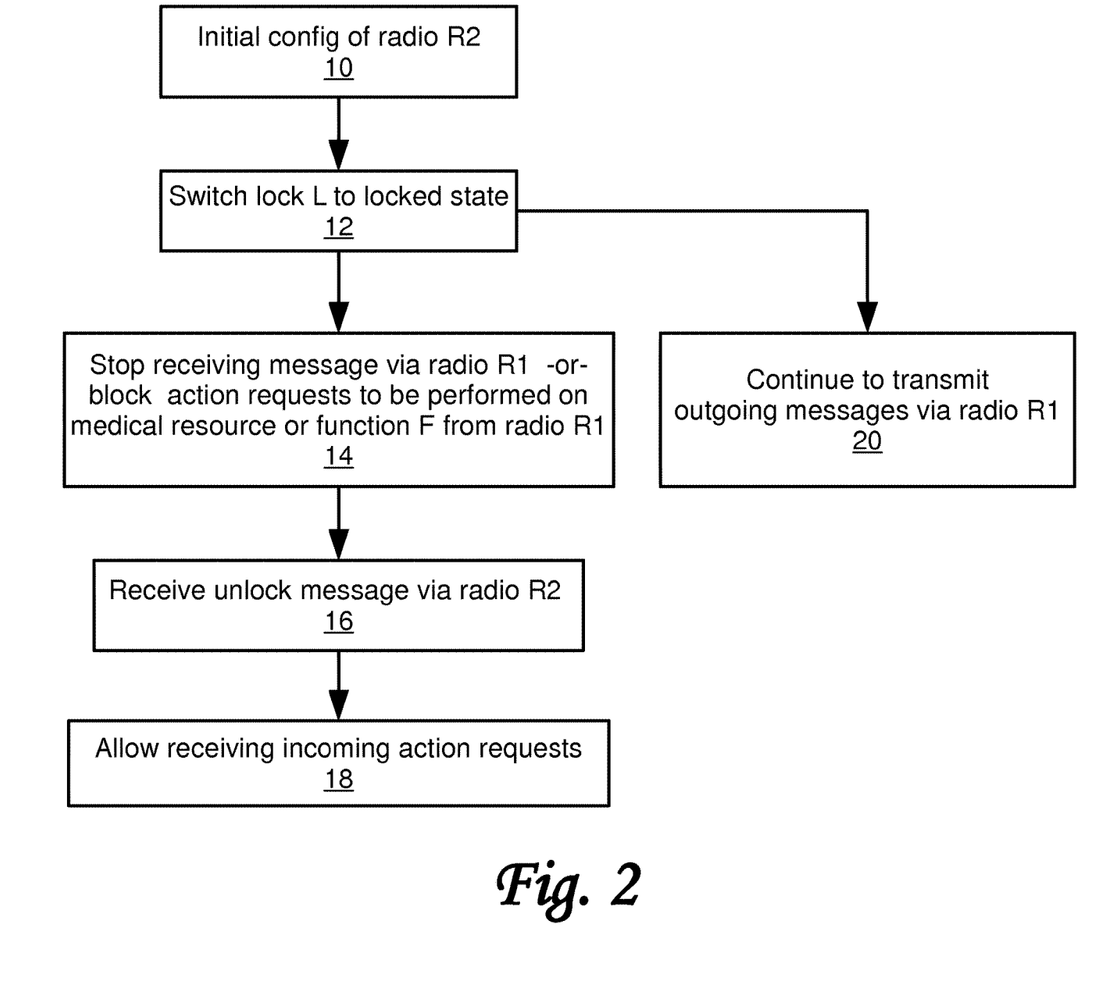
FIGS. 2-9 diagrammatically show communication methods suitably performed in conjunction with the headless medical device of FIG. 1.

With reference to FIGS. 1 and 2, in one embodiment, a headless device S operates a security-sensitive resource/ function F (e.g. a medical resource or function such as a vital signs sensor function, drug delivery function, secure storage, secured wireless connection). The headless device S is equipped with a first wireless radio R1 operating wireless protocol W1, and a second wireless radio R2 operating wireless protocol W2. After initial configuration 10 of the second radio R2 to securely connect to a trusted network N, the device S switches 12 a lock status L to a locked state, during which the device S either stops 14 receiving messages from wireless first radio R1 or during which the device S blocks any incoming action request to be performed on the medical resource or function F received from any device D over first radio R1, until after wireless medical device S has received 16 a message over the second radio R2 while connected to trusted network N to allow receiving incoming action requests 18 from device D. In other words, the second radio R2 is used to lock or unlock the lock status L of the medical device S with respect to its ability to process action requests received via the first radio R1 modifying the medical resource or function F.

By way of non-limiting illustration, in an example in which the first radio R1 operates in accord with a Near-Field Communication (NFC) protocol and the second radio R2 operates with a Bluetooth protocol, an action request to be performed on the medical resource or function F may comprise transferring a password, passcode, or other authentication secret (to perform the initial configuration 10 of radio R2), configuring a patient identification (PID), adjusting patient-specific operational parameters (e.g. infusion flow rate), and/or so forth. This can for example be done with NFC using a negotiated BLE handover (with handover request and handover select messages exchanged in NFC forum peer-to-peer mode) as specified in Bluetooth® Secure Simple Pairing Using NFC, Application Document, NFC-Forum-AD-BTSSP_1_1, 2014. The NDEF record based handover messages may be extended with additional information fields (such as PID) as required for the application. When the lock status L is in the locked state, the medical device S may block incoming action requests to be performed on the medical resource or function F by deactivating or switching off, or by activating a firewall blocking the incoming messages on first radio R1, or by being programmed to ignore any incoming message requesting action to be performed on the medical resource or function F when in the locked state.

While the lock status L is in the locked state, in some embodiments the first radio R1 may still be useful to transmit outgoing messages 20, e.g. to broadcast alarm messages in case the sensor determines that second radio R2 is being attacked or misused.

Figure 3:
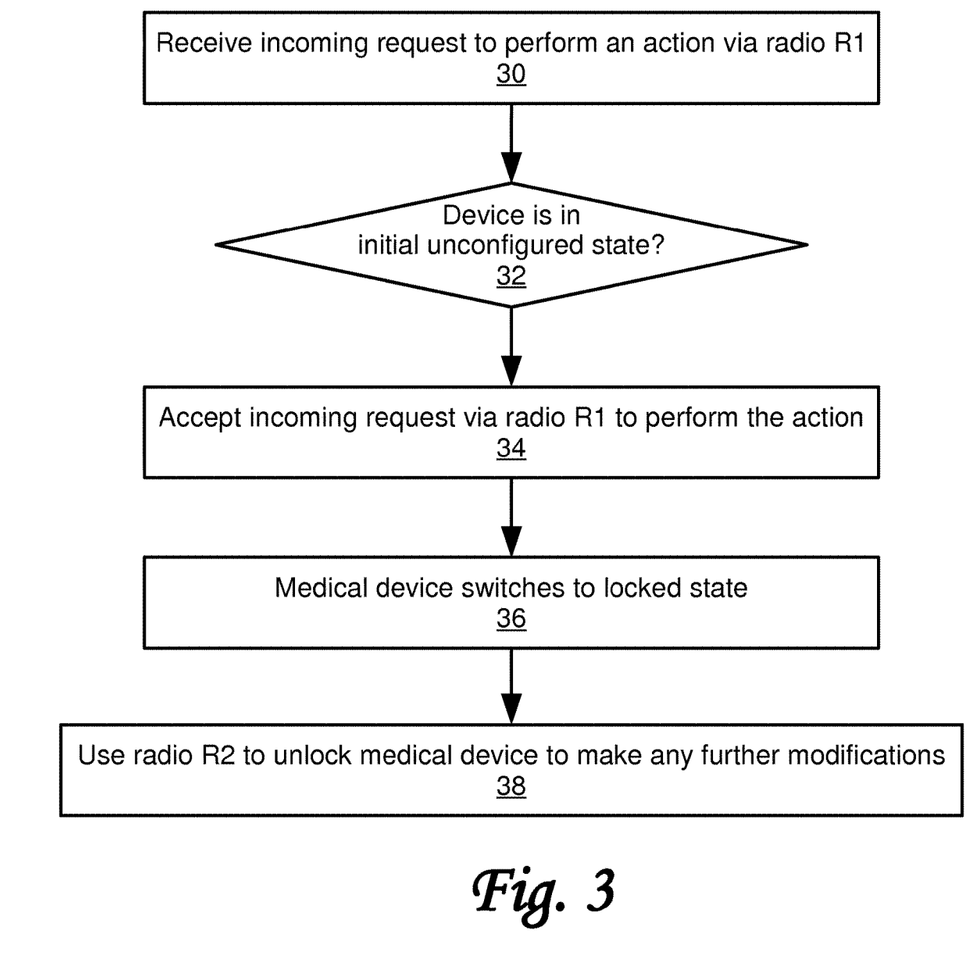

With reference to FIG. 3, one approach for initiating the configuration of the resource or function F is as follows. Upon receiving 30 an incoming request via first radio R1 to perform an action to configure the medical resource or function F, the wireless medical device S accepts 34 the incoming request over first radio R1 to perform that action if the device is in an initial unconfigured state 32, after which device S switches to a locked state 36. Thereafter, to make any further modifications to the medical resource or function F, the second radio R2 must be used to unlock 38 the medical device S with respect to such further modification of the medical resource or function F.

In one illustrative embodiment, the first radio R1 employs a wireless protocol W1 which is a proximity-based wireless protocol (e.g., having a range that is 10 cm or less in some embodiments) such as Near-Field Communication (NFC), Qi data communication, ISO/IEC 14443, while the second radio R2 employs a wireless protocol W2 which is a short-range wireless protocol (e.g., having a range that is 50 meters or less) such as Bluetooth, IrDA, Zigbee, IEEE 802.15.4, or medium range protocol (e.g. having a range that is 100 meters or less) such as Wi-Fi, DECT, or long range protocols (e.g. having a range that is larger than 100 meters) such as LTE Cat-M1, NB-IoT, LoRa. The incoming action request to modify the medical resource or function F, which is received over R1, may for example be an action request to store a security credential (e.g. passkey, public key, X.509 certificate, private key, shared key, long term key) for performing secure pairing (e.g. LE secure pairing as defined in Bluetooth v4.2, WPA/WPA2 as defined in Wi-Fi Protected Access Specification/Test plan, Diffie-Helman key exchange) the radio R2 between medical device S and a set of access points, small cells or base stations and/or connected devices that together form a closed trusted network N (e.g. a clinical network within a hospital). The device S accepts the incoming request over the first radio R1 to perform that action if the second radio R2 is in the initial unconfigured state (or, put another way, on initial deployment the lock status L is in the unlocked state) and after initial configuration the device S switches the lock status L to the locked state and remains in the locked state until it receives an authenticated message to unlock first radio R1 over second radio R2. Note that when radio R2 is in the initial unconfigured state, device S should block or ignore any incoming secure pairing messages until after it has received a security credential C over R1 that enables the device to set up a secure connection to the trusted network N using the received security credential C (i.e., operation 10 of FIG. 2). Note that this operation assumes that device D will inform (via Network N) the set of access points, small cells or base stations to which device S would be able to connect, with a corresponding security credential to be used for pairing with device S.

Figure 4:
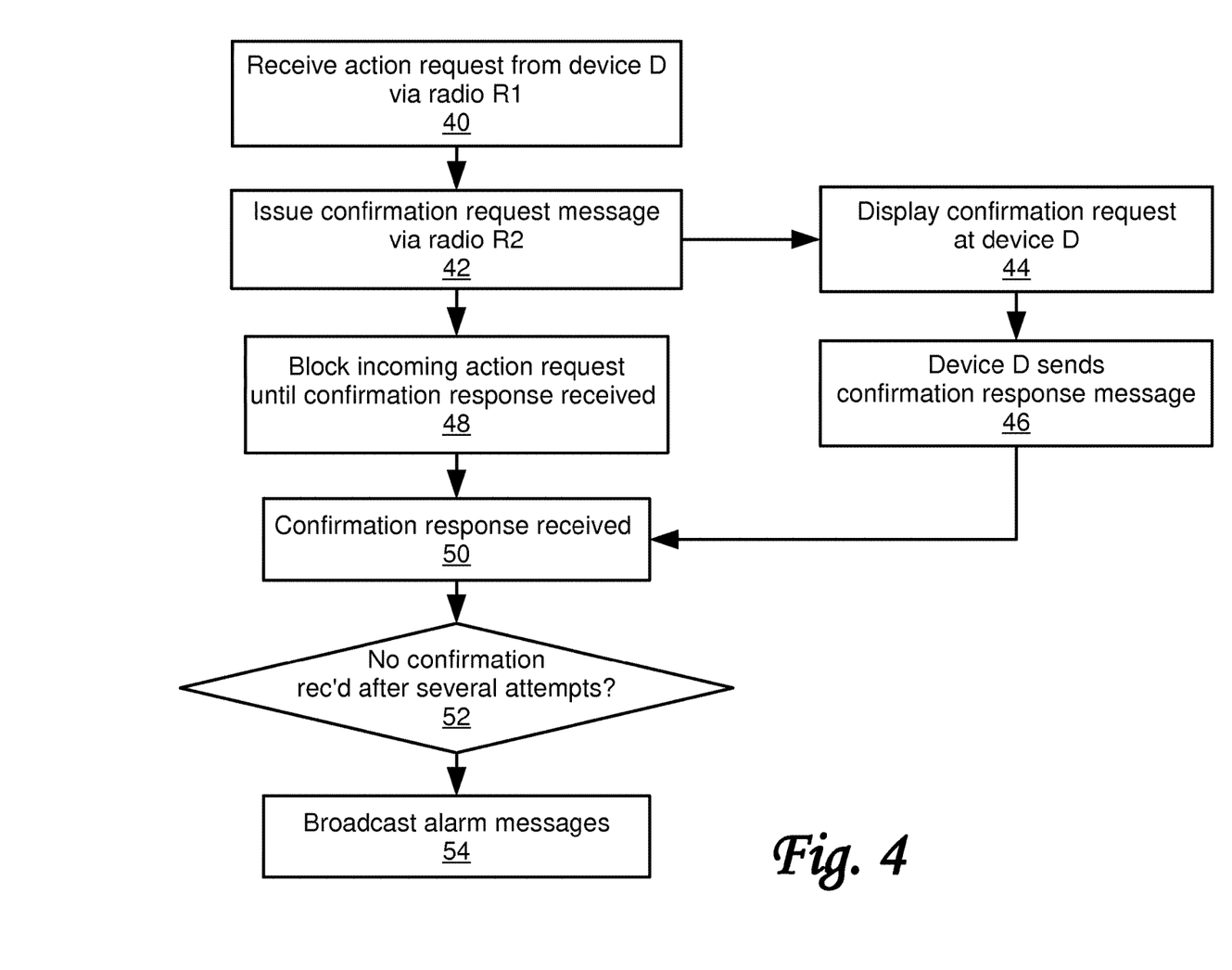

With returning reference to FIG. 1 and with further reference to FIG. 4, another illustrative embodiment comprises a system X comprising the headless device S as denoted above and a configuration device D. Upon the headless device S receiving an incoming request from the configuration device D via the first radio R1 to perform an action 40 on the medical resource or function F, the device S confirms that device D is part of network N. In one implementation, device S issues a confirmation request message 42 over second radio R2 targeted at device D. In one implementation, the configuration device D displays the confirmation request 44 from device S on its screen (i.e. display), after which device D sends a confirmation response message 46 to the headless medical device S. The headless devices S blocks the incoming action request 48 to modify medical resource or function F received from device D over first radio R1, unless headless device S receives the confirmation response message 50 from D via the second radio R2 that it is ok to accept the incoming request. If the headless medical device S does not receive the confirmation message after several attempts 52, then in some embodiments the device S starts broadcasting alarm messages 54 since this lack of confirmation suggests the headless medical device S may be under attack. To implement this, it is again noted that the lock status being in the locked state does not (in some embodiments) block outgoing messages. In a further optional aspect, the confirmation request may reveal history of treatment information administered by the medical device S when being displayed on configuration device D, in order to prevent replay attacks and to deal with wireless network glitches causing retries.

One illustrative approach for confirming that configuration device D can be reached via network N uses reverse ARP protocol or some automatic address translation (e.g. in case a device operates a Wi-Fi direct and Wi-Fi infrastructure connection at the same time, the device uses a different MAC address which is based on the same original MAC address built-in to the device by using some bit flipping).

Figure 5:
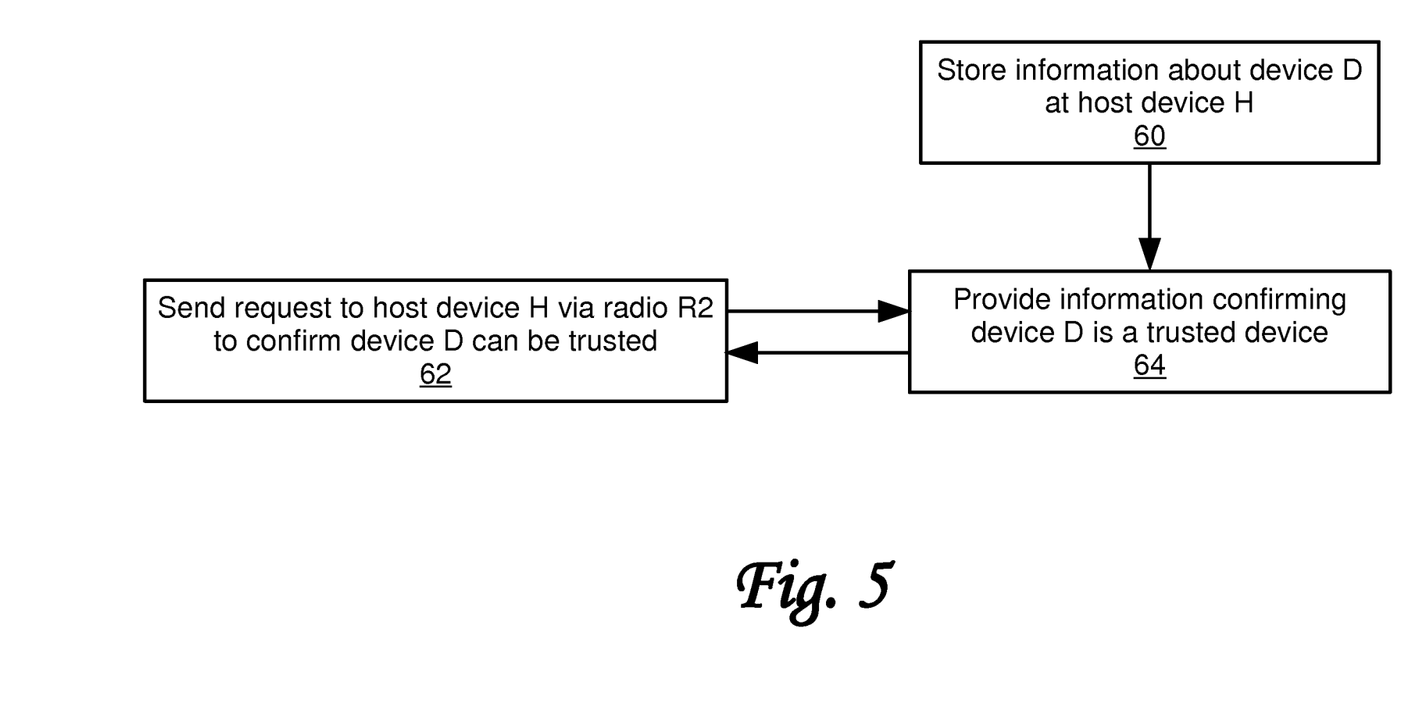

With returning reference to FIG. 1 and further reference to FIG. 5, in a further optional aspect, system X may include an additional host device H reachable through network N. The host device H stores information 60 about the configuration device D, and device S sends a request 62 via radio R2 (as diagrammatically indicated in FIG. 1) to H to confirm that configuration device D can be trusted and/or is part of the network. Device H may provide information 64 to device S confirming that device D is a trusted device, and/or provide information on how to reach device D. The reason for this is that device D could be on a different subnet (i.e. working with a different range of IP addresses), as it may use a different radio at that moment. In this case, the additional host device H may be employed to keep track of the devices in the network and stores information about them, such as their address information in different sub-networks. Such a host device H (e.g. an AP controller) may also act as a bridging device. In particular if the network N operates via Wi-Fi using IP addresses, and configuration device D connects via Bluetooth to device S, then the host device H retrieves the information about device D and how to reach it based on device D's Bluetooth address instead of its IP address or its 802.11 MAC address.

Figure 6:
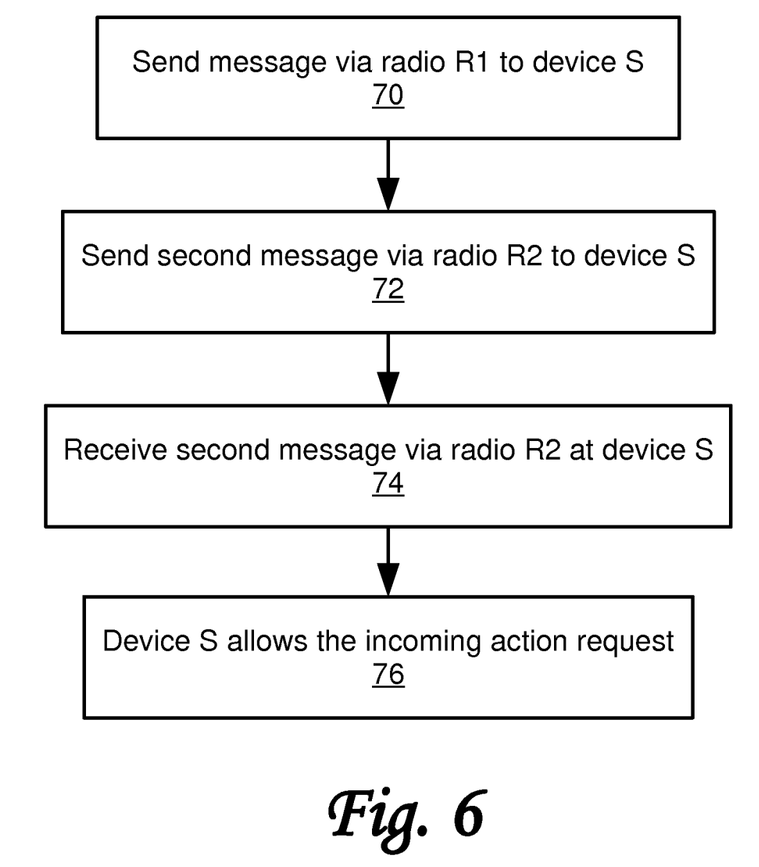

With returning reference to FIG. 1 and with further reference to FIG. 6, in another implementation, upon sending 70 a message via radio R1 to device S, device D sends 72 a second message (e.g. a request for temporarily unlock) via network N to device S, either directly or via device H by proxy, upon which after receiving 74 the second message from device D from network N via radio R2, device S determines 76 that device D is part of network N and allows the incoming action request.

Figure 7:
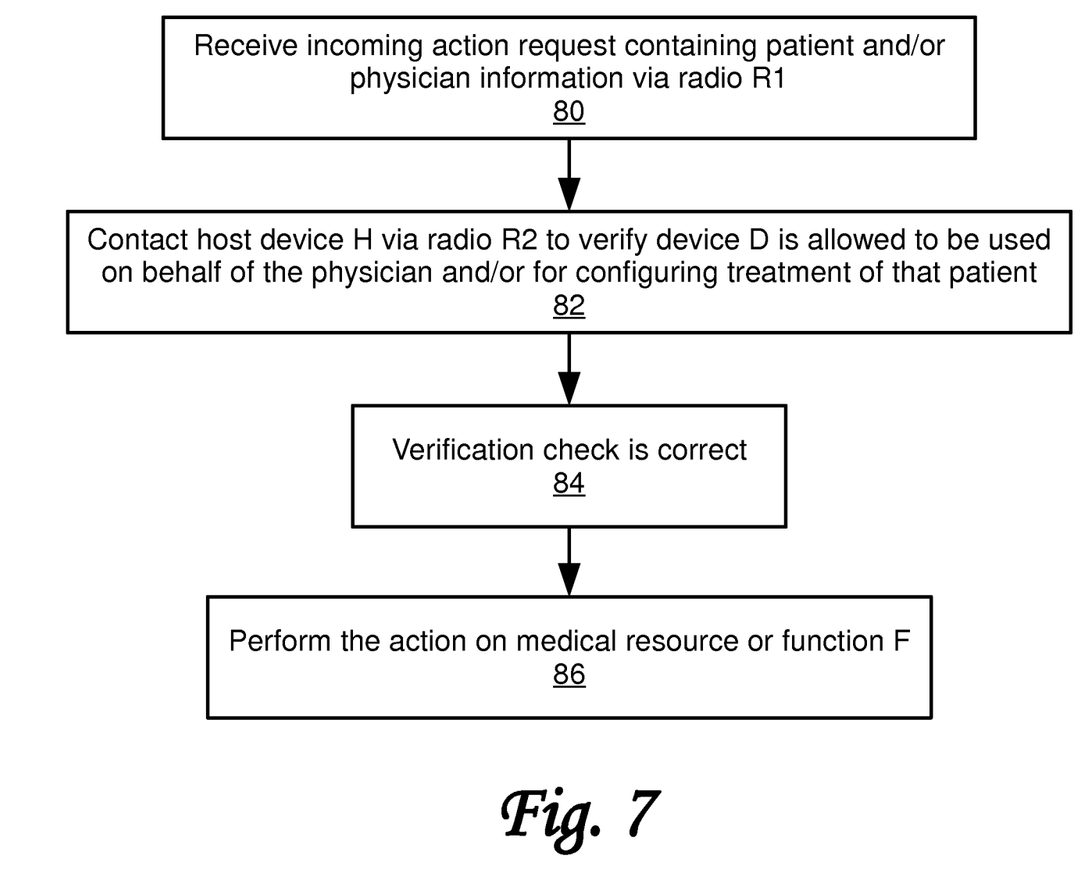

With returning reference to FIG. 1 and with further reference to FIG. 7, in another embodiment the incoming action request 80 over first radio R1 contains patient and/or physician information, and medical device S contacts the host device H 82 via radio R2 (as diagrammatically shown in FIG. 1) to verify that configuration device D is allowed to be used on behalf of the physician and/or for configuring treatment of that patient (e.g. by verifying if a received credential matches a credential of the physician). Only if that additional verification check is correct 84 will the medical device S perform the action 86 on medical resource or function F. Note that this credential may be a set or a chain of credentials of different care takers (of different ranks) Device S may be further configured with a special credential to allow re-configuration or (temporarily) unlocking by a different physician not registered with the host device H in case of emergency situations. A device S may allow this over both radio R1 or R2, as long as device S can verify that the configuration device D used in the emergency situation possesses this special credential, e.g. by using an authentication protocol (such as Diffie-Helman) over radio R1 or R2.

In a further optional aspect, the host device H may assist the headless medical device S to detect the device that the physician currently actively uses, and send a confirmation request message to it.

To avoid losing connection with trusted network N if an attempt to modify medical resource/function F is received from some (inappropriate, e.g. hacker's) device (not shown), the following approach can be employed. If headless device S receives a new configuration for communicating with device D, then it stores the old configuration, and attempts to connect with the configuration device using the new configuration to a trusted backend server (e.g. known host H as in the above system). If this attempt is not successful then the new configuration is discarded and the old configuration (for appropriate configuration device D) is retrieved from storage and operation falls back to old configuration.

Figure 8:
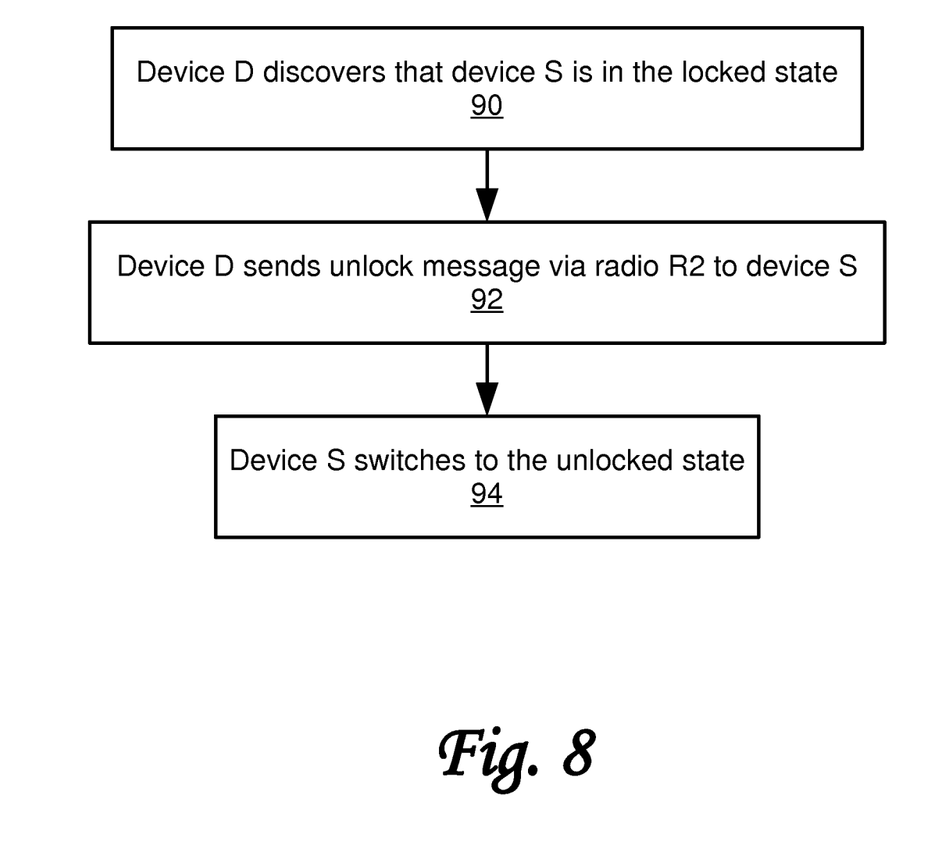

With returning reference to FIG. 1 and with further reference to FIG. 8, in another optional aspect, configuration device D can discover 90 that device S has its lock status L in the locked state (e.g. through an outgoing message via first radio R1, or through pre-association service discovery information over second radio R2, or by letting host device H store information about the locked status of device S after which configuration device D can request this information). Configuration device D sends (or a trusted host device H is requested by device D to send) an unlock message 92 via the second radio R2 to medical device S, and in response the device S switches its lock status L to the unlocked state 94 after receiving this message. In case first radio R1 is not switched off, the unlocking may also be done by closing the loop via second radio R2 with configuration device D, or that during initial configuration, configuration device D sends a credential that device S should store to enable unlocking, and medical device S stores this credential, and after entering the locked state, configuration device D requests medical device S to switch from the locked state back to the unlocked state by sending a message containing the credential via first radio R1 or second radio R2 to the medical device S.

Figure 9:
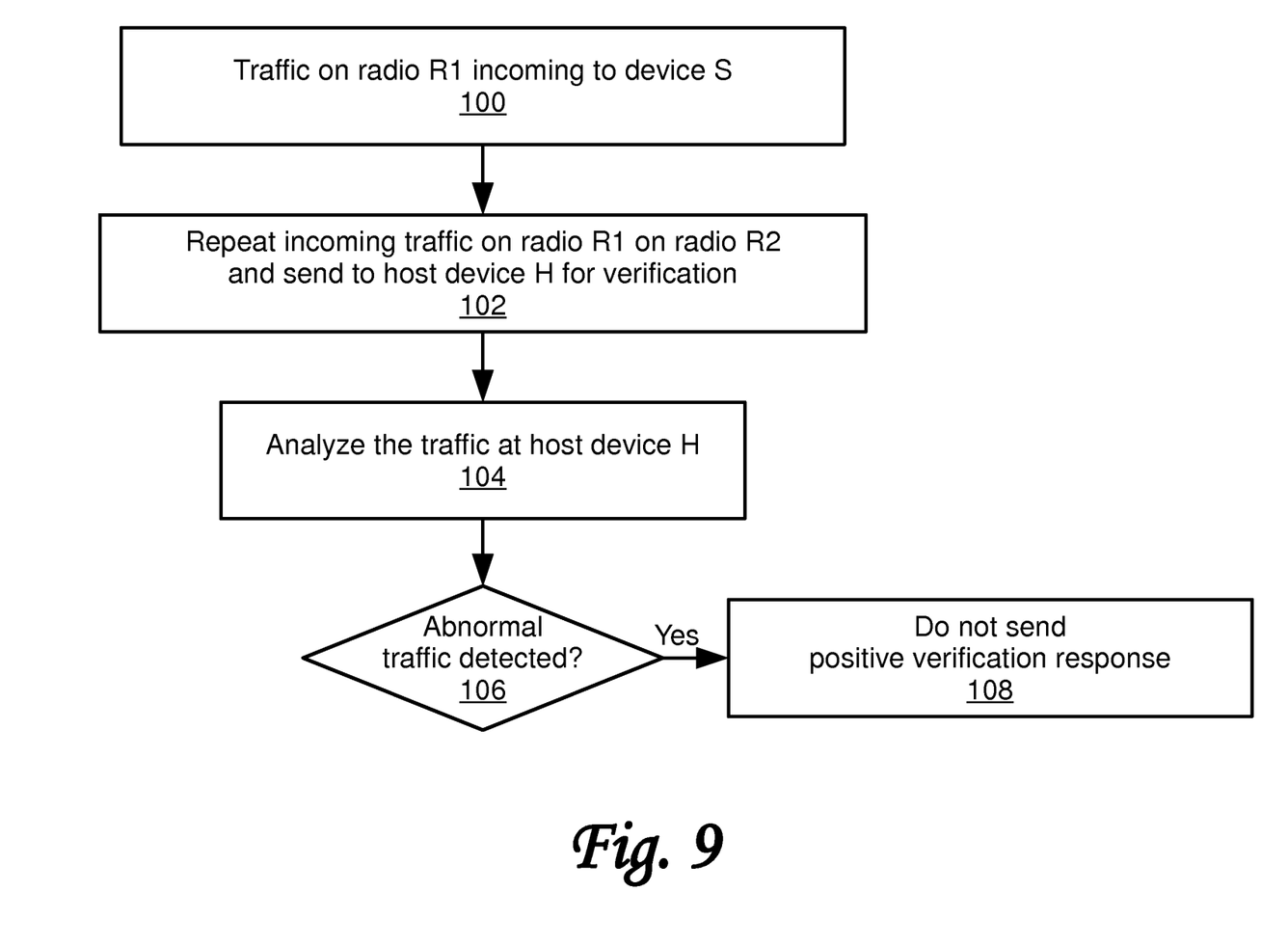

With returning reference to FIG. 1 and with further reference to FIG. 9, in a further optional aspect, the wireless medical device S repeats 102 all incoming traffic on radio R1 100 on radio R2 and sends it to the host device H for verification, and the host device H is equipped with a monitoring function to analyze the traffic 104. If the host device H detects abnormal traffic 106 (e.g. replayed messages), then the host device H does not send a positive verification response to the wireless medical device S 108, or sends a request to the device S to switch off first radio R1. This approach avoids overloading the medical device S during a denial-of-service (DOS) attack, and can prevent execution of hacking algorithms (e.g. security code cracking algorithms).

In sum, the headless device S includes two radios R1, R2, and maintains a lock status L that can switch between a locked state and an unlocked state. In the locked state, the headless device S does not listen to incoming requests on one radio R1 from a configuration device, or does not act on action requests to modify the medical resource/function F when in the locked state. By closing the loop with the configuration device D by communicating over both the first radio R1 and the second radio R2 with the configuration device D, the disclosed approach provides a simple, yet powerful mechanism to prevent malicious interaction with the medical resource/function F if one of the radios is under attack, e.g. by verifying that the configuration device can be reached from a trusted network and asking for an additional confirmation from the configuration device over a different network path. This makes it much more difficult to attack the medical resource/function F, as doing so would entail attacking both radios R1, R2 simultaneously. Advantageously, the more vulnerable radio can be switched off after initial configuration. In the illustrative example, this more vulnerable radio is the NFC (first radio R1 in the illustrative example) which is normally considered safe, but may not be sufficiently safe in case of healthcare, in case a malicious person can get in close vicinity of the patient.

In some embodiments, a symmetrical operation of the two radios R1, R2 is employed in the security implementation, that is, if radio R2 receives a request to take action on the medical resource or function F, then radio R1 can be used to close the loop as already described in the analogous case in which R1 receives the request.

The wireless medical device S includes components such as a microprocessor, microcontroller, Field Programmable Gate Array (FPGA), graphical processing unit (GPU), or other programmable electronic chip C (optionally multi-core, including a math coprocessor, or otherwise enhanced) and a non-transitory storage medium M storing instructions readable and executable by the programmable electronic chip C to perform functionality pertaining to implementing the medical resource or function F and to implement device configuration protocols as disclosed herein. The non-transitory storage medium M may comprise (by way of non-limiting illustrative example) a FLASH memory, read only memory (ROM), electronically erasable programmable ROM (EEPROM), or variants thereof, and/or a magnetic storage medium (e.g. hard disk), optical storage medium (e.g. optical disk), various combinations thereof, and/or so forth. The medical resource or function F performed by the mobile medical device S depends upon the type of device, and the device S may include additional components as appropriate for performing the medical resource or function F.

Figure 10:
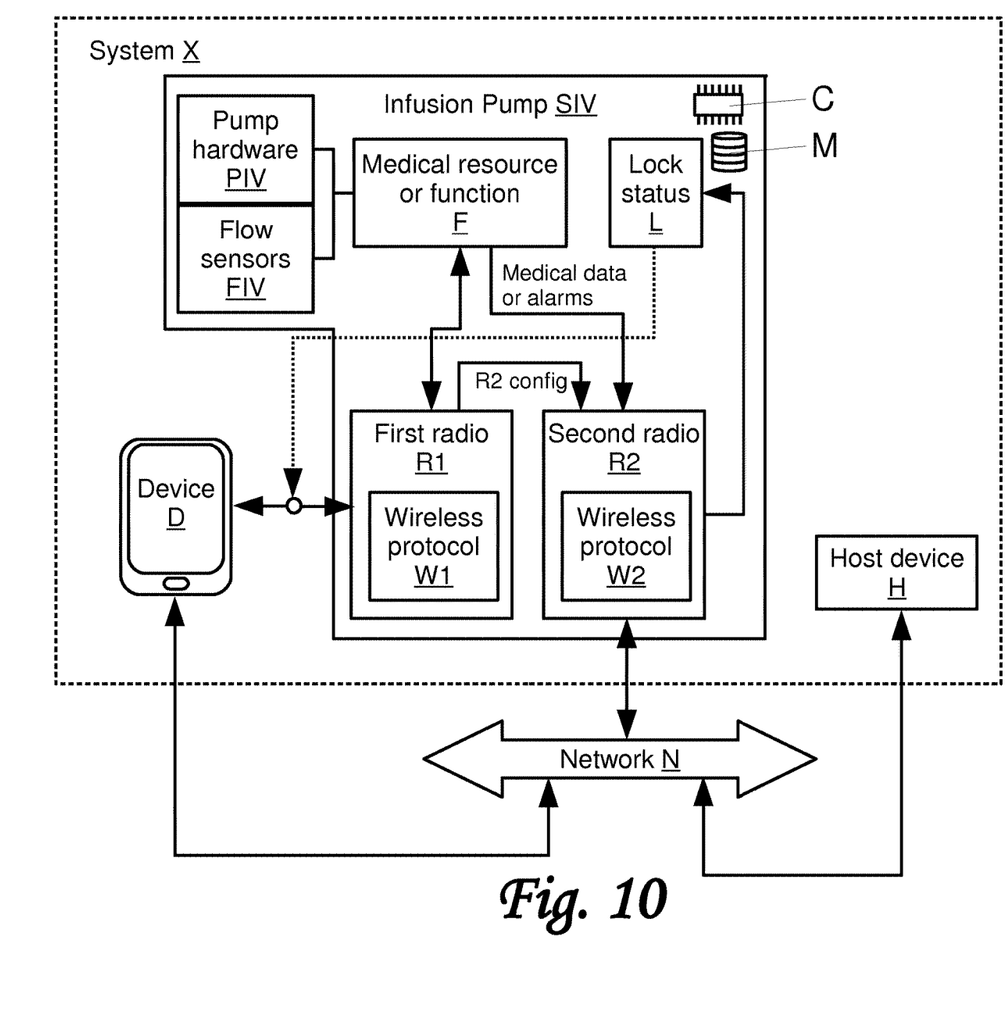
FIG. 10 diagrammatically illustrates an embodiment in which the headless medical device of FIG. 1 comprises an infusion pump.

With reference to FIG. 10, for example, in the case of the medical device S comprising an infusion pump SIV, the device SIV includes suitable pump hardware PIV and flow sensors FIV and/or so forth, and the medical resource or function F may include functions such as controlling intravenous (IV) fluid flow, measuring IV fluid flow, measuring temperature of IV fluid, and/or so forth, and the programmable electronic chip C is programmed to implement the medical resource or function F including operating the pump SIV based on flow feedback from the flow meter to deliver a controlled flow of IV fluid and optionally to perform other related functions such as monitoring IV fluid temperature or so forth.

Figure 11:
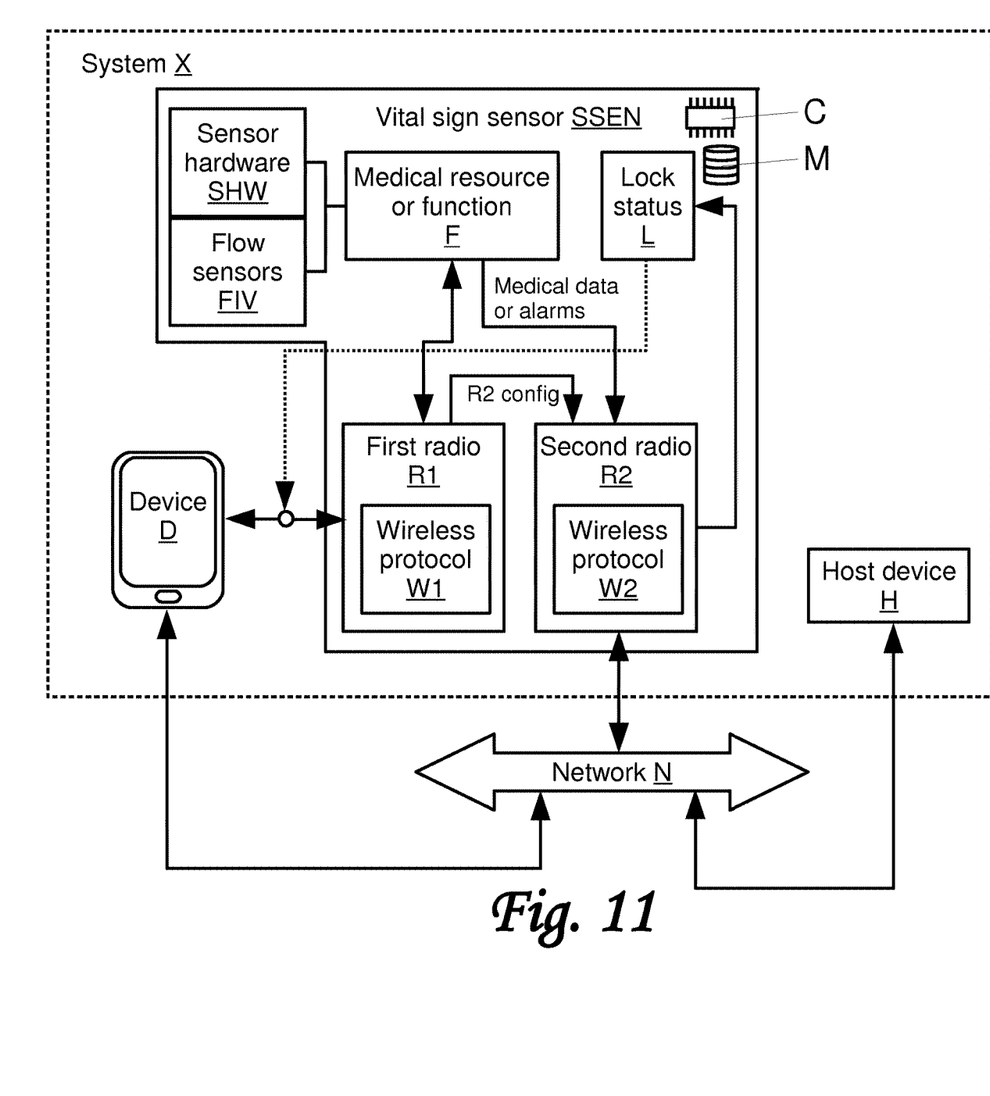
FIG. 11 diagrammatically illustrates an embodiment in which the headless medical device of FIG. 1 comprises a vital sign sensor.

With reference to FIG. 11, as another example, in the case of the wireless medical device S comprising a vital sign sensor SSEN the device SSEN suitably further includes sensor hardware SHW (e.g. EGC, EEG, or HR monitor electrode, a blood pressure cuff and inflation pump hardware, et cetera) and the programmable electronic chip C is programmed to implement the medical resource or function F including operating the sensor hardware to acquire vital sign data.

These are merely non-limiting illustrative examples, and more generally the wireless medical device may be otherwise configured to provide desired medical resource(s) and/or to perform desired medical function(s). Moreover, it is contemplated for the device S to be a device for performing a non-medical task in the context of non-medical applications. In the illustrative examples, the device S is a headless device; however, it is alternatively contemplated for the device S to be otherwise, e.g. to include a graphical user interface (GUI) for user interfacing.

The radios R1, R2 each include components (not shown) such as a radio frequency transmitter and a radio frequency receiver (or an integrated transceiver) operatively connected with an antenna to transmit and receive signals in accord with a particular wireless communication protocol. It is noteworthy that some wireless medical devices include two radios for other purposes, e.g. may include both WiFi and Bluetooth connectivity, and similarly some wireless chipsets come equipped with two radios (e.g. a Bluetooth/Wi-Fi combo chipset/SoC, such as many chipsets nowadays). In the case of such a medical device, the available two radios can be utilized as the first and second radios R1, R2 as disclosed herein. The additional battery usage to enable this is typically low, as the second radio R2 only needs to be switched on when being reconfigured (e.g. when patient visits hospital) which may not occur very often, and possibly be switched off during normal operation via R1.

As another variant, it will be appreciated that the two radios R1, R2 may not necessarily be two physically different radios, but rather may be two different virtual radios sharing the same physical radio transceiver hardware.

As another variant, it will be appreciated that one or both of the two radios R1, R2 may be replaced by other types of communication interfaces, a wired communication interface such as a USB or microUSB port. In this case the headless medical device S includes an appropriate physical connector port (e.g. USB or microUSB connector port), and the configuration device D likewise includes an appropriate physical connector port (e.g. USB or microUSB connector port) and is physically attached by an appropriate cable (e.g. USB or microUSB cable) with the medical device S to establish the communication link corresponding to the replaced radio R1 or R2.

Generalizing the foregoing, it will be appreciated that the disclosed security approaches employ a first communication interface (represented by first radio R1 in the illustrative embodiments) for communicating with the medical device S, and a second communication interface (represented by second radio R2 in the illustrative embodiment) for communicating with the medical device S that is independent of the first communication interface.

The invention has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:
1. A device comprising:
a first communication interface for communicating with the device, the first communication interface comprising a first radio;
a second communication interface for communicating with the device;
a programmable electronic chip; and
a non-transitory storage medium storing instructions readable and executable by the programmable electronic chip to operate a medical function, and to:
receive, via the first communication interface, a request to initially configure the second communication interface, wherein the request is from the device and bypasses a trusted network via a first wireless communication protocol of the first radio of the first communication interface;
initially configure the second communication interface to securely connect to the trusted network in response to receiving the request via the first wireless communication protocol of the first radio of the first communication interface, and then switch a lock status of the device to a locked state in response to completion of the initial configuration of the second communication interface to securely connect to the trusted network, wherein the second communication interface utilizes a different second communication protocol; and
after the initial configuration of the second communication interface to securely connect to the trusted network:
receive, via the second communication interface, a message from the device over the trusted network to allow reception of incoming action requests;
control, via the second communication interface, the lock status of the device to switch the lock status of the device to an unlocked state in response to the message to allow reception of incoming action requests;
receive, via the first communication interface, an action request relating to the second communication interface or to the medical function; and execute the action request conditional upon the lock status controlled via the second communication interface being in an unlocked state.

2. The device of claim 1 wherein:
the first radio operating in accord with the first wireless protocol; and
the second communication interface comprises a second radio operating in accord with the different second communication protocol, wherein the different second communication protocol comprises a second wireless protocol.

3. The device of claim 2 wherein the first radio operates in accord with a Near-Field Communication protocol and the second radio operates with a Bluetooth protocol.

4. The device of claim 2 wherein the first radio and the second radio are two different virtual radios sharing the same physical radio transceiver hardware.

5. The device of claim 1 wherein:
the second communication interfaces comprises a wired communication interface.

6. The device of claim 1 wherein, after the initial configuration of the second communication interface and upon the second communication interface changing the lock status of the device to locked, the instructions readable and executable by the programmable electronic chip are further to perform one of the following actions:
a) deactivate the first communication interface;
b) activate a firewall blocking incoming messages on first communication interface; or
c) ignore any incoming action request messages on first communication interface.

7. A system comprising:
a device as set forth in claim 6; and
a configuration device configured to transmit a security credential relating to the second communication interface over the first communication interface when the lock status of the device is unlocked, the device using this credential in the initial configuration to set up a secure communication channel over the second communication interface.

8. The system of claim 7 further comprising:
a host device cooperating with the configuration device after the initial configuration of the second communication interface to control, via the second communication interface, the lock status of the device.

9. A system comprising:
a device as set forth in claim 6; and
a configuration device configured to, after the initial configuration of the second communication interface, transmit via the first communication interface the action request and to control, via the second communication interface, the lock status of the device.

10. The device of claim 1 after the initial configuration of the second communication interface and upon the second communication interface changing the lock status of the device to locked, the instructions readable and executable by the programmable electronic chip are further to perform the following action:
ignore any incoming action request messages on first communication interface.

11. The device of claim 1 comprising an infusion pump wherein the infusion pump further comprises pump hardware and a flow sensor and the medical function includes measuring intravenous fluid flow using the flow sensor and operating the pump hardware to control the intravenous fluid flow based on flow feedback from the measured IV fluid flow.

12. The device of claim 1 comprising a vital sign sensor wherein the vital sign sensor further comprises sensor hardware and the medical function includes operating the sensor hardware to acquire vital sign data.

13. A method performed in conjunction with a medical device that includes a first communication interface and a second communication interface, the method comprising:
receiving, via the first communication interface, a request to initially configure the second communication interface, wherein the request is from the medical device and bypasses a trusted network via a first wireless communication protocol of a first radio of the first communication interface;
initially configuring the second communication interface to securely connect to the trusted network in response to receiving the request via the first wireless communication protocol of the first radio of the first communication interface, and then switching a lock status of the medical device to a locked state in response to completion of the initial configuration of the second communication interface to securely connect to the trusted network, wherein the first communication interface comprises the first radio, and wherein the second communication interface utilizes a different second communication protocol;
after the initial configuration of the second communication interface to securely connect to the trusted network:
performing a medical function using the medical device;
receive, via the second communication interface, a message from the medical device over the trusted network to allow reception of incoming action requests;
controlling, via the second communication interface of the medical device, the lock status of the medical device to switch the lock status of the medical device to an unlocked state in response to the message to allow reception of incoming action requests;
receiving, via the first communication interface of the medical device, an action request relating to the second communication interface or to the medical function; and
executing the action request using the medical device conditional upon the lock status of the medical device being in an unlocked state.

14. The method of claim 13 further comprising, upon the controlling of the lock status of the medical device changing the lock status to locked, one of the following:
a) deactivating the first communication interface of the medical device;
b) activating a firewall blocking incoming messages on first communication interface of the medical device; or
c) ignoring any incoming action request messages received on first communication interface of the medical device.

15. The method of claim 13 wherein the controlling of the lock status of the medical device includes:
changing the lock status from locked to unlocked in response to an unlock message received via the second communication interface.

16. The method of claim 15 further comprising:
responsive to receiving the action request via the first communication interface of the medical device, issuing a confirmation request message via the second communication interface of the medical device, wherein the unlock message is received via the second communication interface of the medical device in response to issuance of the confirmation request message.

17. The method of claim 15 wherein:
the action request is received via the first communication interface of the medical device from a configuration device; and
the unlock message is received via the second communication interface of the medical device from the configuration device.

18. The method of claim 15 further comprising:
storing information about a configuration device at a host device;
wherein the action request is received via the first communication interface of the medical device from the configuration device; and
wherein the unlock message is received via the second communication interface of the medical device from the host device.

19. A non-transitory storage medium storing instructions readable and executable by a medical device having a first communication interface and a second communication interface to perform operations comprising operations to:
receive, via the first communication interface, a request to initially configure the second communication interface, wherein the request is from the medical device and bypasses a trusted network via a first wireless communication protocol of a first radio of the first communication interface;
initially configure the second communication interface to securely connect to the trusted network in response to receiving the request via the first wireless communication protocol of the first radio of the first communication interface, and then switching a lock status of the medical device to a locked state in response to completion of the initial configuration of the second communication interface to securely connect to the trusted network, wherein the first communication interface comprises the first radio, and wherein the second communication interface utilizes a different second communication protocol;
after the initial configuration of the second communication interface to securely connect to the trusted network:
perform a medical function using the medical device;
receive, via the second communication interface, a message from the medical device over the trusted network to allow reception of incoming action requests;
change the lock status of the medical device from locked to unlocked in response to the message to allow reception of incoming action requests;
receive, via the first communication interface of the medical device, an action request relating to the medical function; and
execute the action request using the medical device conditional upon the lock status of the medical device being in an unlocked state.

20. The non-transitory storage medium of claim 19 wherein the operations further comprise operations to:
responsive to receiving the action request via the first communication interface of the medical device, issuing a confirmation request message via the second communication interface of the medical device,
wherein the the message to allow reception of incoming action requests is received via the second communication interface of the medical device in response to issuance of the confirmation request message.

* * * * *